United States Patent
Mian et al.

(10) Patent No.: US 10,513,280 B2
(45) Date of Patent: Dec. 24, 2019

(54) OPERATIONS MONITORING FOR EFFECT MITIGATION

(71) Applicant: International Electronic Machines Corporation, Troy, NY (US)

(72) Inventors: Zahid F. Mian, Loudonville, NY (US); Peter Hayes, Delmar, NY (US)

(73) Assignee: International Electronic Machines Corp., Troy, NY (US)

(*) Notice: Subject to any disclaimer, the term of this patent is extended or adjusted under 35 U.S.C. 154(b) by 439 days.

(21) Appl. No.: 15/298,506

(22) Filed: Oct. 20, 2016

(65) Prior Publication Data
US 2017/0106887 A1    Apr. 20, 2017

Related U.S. Application Data

(60) Provisional application No. 62/285,136, filed on Oct. 20, 2015.

(51) Int. Cl.
| | |
|---|---|
| *B61L 27/00* | (2006.01) |
| *B61L 3/02* | (2006.01) |
| *G01V 1/18* | (2006.01) |
| *B61L 27/04* | (2006.01) |
| *G01V 1/00* | (2006.01) |
| *G01V 1/28* | (2006.01) |

(52) U.S. Cl.
CPC .......... *B61L 27/0094* (2013.01); *B61L 3/02* (2013.01); *B61L 27/04* (2013.01); *G01V 1/181* (2013.01); *B61L 27/0005* (2013.01); *B61L 2201/00* (2013.01); *G01V 1/001* (2013.01); *G01V 1/288* (2013.01)

(58) Field of Classification Search
None
See application file for complete search history.

(56) References Cited

U.S. PATENT DOCUMENTS

| | | | |
|---|---|---|---|
| 6,216,985 B1 * | 4/2001 | Stephens | B61K 9/10 246/120 |
| 7,403,132 B2 * | 7/2008 | Khatwa | G01C 23/00 340/970 |
| 7,469,859 B1 | 12/2008 | Campbell | |
| 8,140,250 B2 | 3/2012 | Mian et al. | |
| 8,326,582 B2 | 12/2012 | Mian et al. | |
| 8,655,540 B2 | 2/2014 | Mian et al. | |
| 8,925,873 B2 | 1/2015 | Gamache et al. | |
| 9,714,043 B2 * | 7/2017 | Mian | B61L 27/0094 |
| 2004/0194549 A1 | 10/2004 | Noel | |

(Continued)

OTHER PUBLICATIONS

NHO, International Application No. PCT/US2016/057837, International Search Report and Written Opinion, dated Jan. 31, 2017, 16 pages.

*Primary Examiner* — Thomas G Black
*Assistant Examiner* — Demetra R Smith-Stewart
(74) *Attorney, Agent, or Firm* — LaBatt, LLC

(57) ABSTRACT

A solution for managing effect-generating operations is provided. Data regarding one or multiple types of effects being generated by the operations can be acquired and analyzed. When necessary, actions can be initiated to benefit affected individuals or to improve the operations, e.g., by mitigating a source of excessive effects. In an illustrative application, the effect-generating operations are train operations and the types of effects include acoustic and/or vibration effects.

20 Claims, 8 Drawing Sheets

(56) References Cited

U.S. PATENT DOCUMENTS

| | | | |
|---|---|---|---|
| 2005/0100172 A1 | 5/2005 | Schliep et al. | |
| 2009/0187291 A1* | 7/2009 | Daum | B61L 3/006 |
| | | | 701/2 |
| 2009/0234521 A1* | 9/2009 | Kumar | B60L 11/1851 |
| | | | 701/19 |
| 2009/0326746 A1 | 12/2009 | Mian | |
| 2012/0217351 A1 | 8/2012 | Chadwick et al. | |
| 2013/0171590 A1* | 7/2013 | Kumar | B61L 3/006 |
| | | | 434/62 |
| 2015/0232097 A1* | 8/2015 | Luther | B61L 3/006 |
| | | | 701/123 |
| 2016/0046308 A1* | 2/2016 | Chung | B61L 25/025 |
| | | | 701/20 |
| 2016/0207552 A1 | 7/2016 | Mian et al. | |

* cited by examiner

OPERATIONS MONITORING FOR EFFECT MITIGATION

REFERENCE TO RELATED APPLICATIONS

The current application claims the benefit of U.S. Provisional Application No. 62/285,136, which was filed on 20 Oct. 2015, and which is hereby incorporated by reference.

TECHNICAL FIELD

The disclosure relates generally to effect-inducing operations, and more particularly, to monitoring and/or managing effect-inducing operations both for the benefit of affected individuals as well as the operating entity.

BACKGROUND ART

Current systems for measuring the health of components of railcars in situ through various metrology approaches and of identifying particular railcars with which to associate the health data are described in U.S. Pat. Nos. 8,925,873, 8,655,540, 8,326,582, and 8,140,250, among others. Additionally, attempts have been made to measure specific effects, such as sound levels. However, these attempts have almost universally been for evaluation and planning purposes, not for long-term, real-time monitoring and control of the environmental effects. Because of this, no real work exists on the ability to provide such information in real-time.

Increasingly, installations of residential, research, and manufacturing facilities encroach closely upon operating rail transit lines. Issues of excessive sound, or noise pollution, are well-known issues of quality of life for operating rail lines as well as issues of ride quality for passengers. However, as an increasing number of people are living near rail lines or considering using the train for their commutes, this issue is becoming far more acute.

Additionally, such trains produce significant and variable vibration and can also produce significant electromagnetic interference (EMI) from arcing or from electric drive motors operating at less than optimal levels. While these issues are generally less a concern for residential neighborhoods, they can be extremely important for nearby research institutions, which are performing research on nanoscale levels. In this case, vibrations of a micron or so, or extremely small variations in the electromagnetic field, can severely disrupt operations. Similarly, manufacturing installations involved in sensitive manufacturing, such as manufacturing at very small physical scales (e.g., microchip manufacture), also can be sensitive to such effects. Disruption at the wrong time could cost immense sums of money by damaging a run of chips in a manufacturing facility or by rendering a key experiment useless.

SUMMARY OF THE INVENTION

Aspects of the invention provide a solution for managing effect-generating operations. Data regarding one or multiple types of effects being generated by the operations can be acquired and analyzed. When necessary, actions can be initiated to benefit affected individuals or to improve the operations, e.g., by mitigating a source of excessive effects. In an illustrative application, the effect-generating operations are train operations and the types of effects include acoustic and/or vibration effects.

A first aspect of the invention provides a system for monitoring operation of a train, the system comprising: a first set of sensors for acquiring effect data of a first type; and means for monitoring operation of the train using the effect data acquired by the first set of sensors, wherein the means for monitoring includes: identifying an acceptable threshold for an area of concern for effects of the first type, wherein the area of concern is a non-rail related location susceptible to being affected by the train operation; analyzing the effect data of the first type to determine whether the acceptable threshold will be exceeded for the area of concern; in response to determining the acceptable threshold will be exceeded, initiating an affected user action; analyzing the effect data of the first type to determine whether a train operation action is required; and initiating the train operation action in response to determining the train operation action is required.

A second aspect of the invention provides a system for operating a train, the system comprising: a first set of sensors for acquiring acoustic effect data based on acoustic effects generated by the train; a second set of sensors for acquiring vibration effect data based on vibration effects generated by the train; and means for managing operation of the train using the acoustic and vibration effect data, wherein the means for managing includes: determining an acceptable threshold for an area of concern for vibration effects, wherein the area of concern is a non-rail related location susceptible to being affected by vibration effects; analyzing the vibration effect data to determine whether the acceptable threshold will be exceeded for the area of concern; in response to determining the acceptable threshold will be exceeded, initiating an affected user action; analyzing the vibration and acoustic effect data to determine whether a train operation action is required; and initiating the train operation action in response to determining the train operation action is required.

A third aspect of the invention provides a system for managing vibration-inducing operations, the system comprising: a set of sensors for acquiring vibration effect data at a plurality of locations relating to the vibration-inducing operations and a first area of concern affected by the vibration-inducing operations; and means for managing the vibration-inducing operations using the vibration effect data, wherein the means for managing includes: determining a first acceptable threshold for the first area of concern for vibration effects; analyzing the vibration effect data to determine whether the first acceptable threshold will be exceeded for the first area of concern; in response to determining the first acceptable threshold will be exceeded, initiating an affected user action, wherein the affected user action includes at least one of: adjusting the vibration-inducing operations to avoid exceeding the first acceptable threshold at the first area of concern or informing a first affected user associated with the first area of concern; analyzing the vibration effect data to determine an operational status of the vibration-inducing operations; and initiating a vibration-inducing operation action in response to determining the operational status is impaired.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for managing effect-generating operations. Data regarding one or multiple types of effects being generated by the operations can be acquired and analyzed. When necessary, actions can be initiated to benefit affected individuals or to improve the operations, e.g., by mitigating a source of excessive effects. In an illustrative application, the effect-generating operations are train operations and the types of effects include acoustic and/or vibration effects. As used herein, unless otherwise noted, the term "set" means one or more (i.e., at least one) and the phrase "any solution" means any now known or later developed solution.

Current train operations monitoring systems exist which monitor the operation of the train itself. Additionally, individual systems exist to monitor very specific environmental effects, such as noise and other emissions close the rails. However, the inventors propose a solution, which in at least some embodiments, is capable of recognizing various effects, diagnosing the cause, and providing a comprehensive set of notifications for various interested users, within and/or outside of a rail operating organization, as to these effects and their remedies. In this manner, embodiments of the solution can provide effective monitoring for purposes relevant solely to the operation of the rail vehicle(s), such as trains, as well as purposes relevant solely to others located in the surrounding environment.

In a particular embodiment, multiple types of sensors are emplaced at relevant locations on a train line to monitor various effects of a train's presence and passage. The data from these various sensors can be analyzed individually and via multimodal methods. Results of the analysis can be used to provide informational alerts to various organizations, as well as to advise on operating and/or service requirements for the rail vehicles. The types of sensors can include sensors for acquiring data regarding the existence and levels of one or more of: vibration effects, acoustic effects, and electromagnetic interference (EMI) effects, which is released by the train during its operation. However, it is understood that other types of sensors for acquiring data regarding other types of effects can be implemented. Such effect data can be tracked and analyzed to determine when these levels exceed those appropriate for a given locale. Additionally, the effect data can be tracked and analyzed to determine aspects of the rail vehicle's operational health and provide evaluations and recommendations of action.

Figure 1:
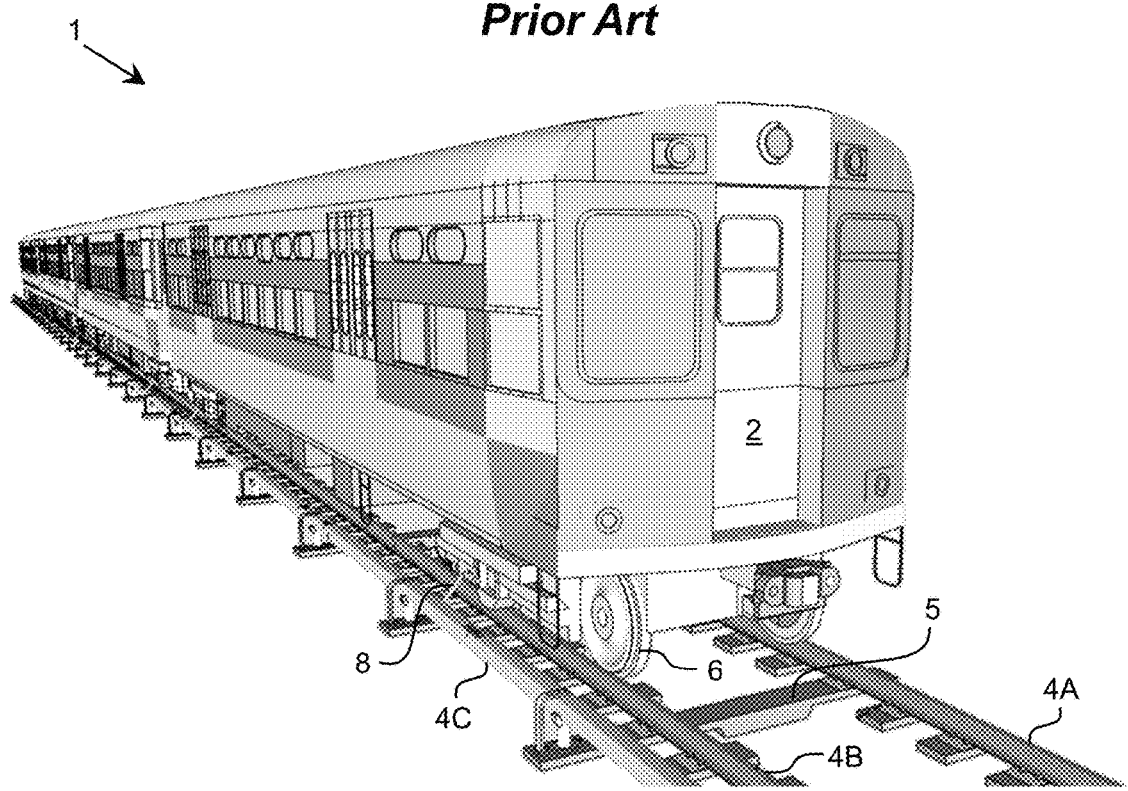
FIG. 1 shows an illustrative transit train according to the prior art.

FIG. 1 shows an illustrative transit train 1 according to the prior art. As is known, the transit train 1 can include one or more cars 2, each of which rides on rails 4A, 4B. The rails 4A, 4B are supported by and kept at a constant separation by ties 5. For an electric-based train 1, a third rail 4C can be used to provide electrical power to the train 1. Other commuter trains 1 may use an electric overhead catenary. Regardless, the same issues described herein apply to both the third rail 4C and the catenaries. The train car 2 rides on the rails 4A, 4B using wheels 6, which can be driven by electric motors associated with one or more of the wheels 6. The electric power is transferred from the third rail 4C to the wheels 6 via a contact shoe 8, which can ride above, below, or on the side of the third rail 4C, depending on the particular design.

Figure 2:
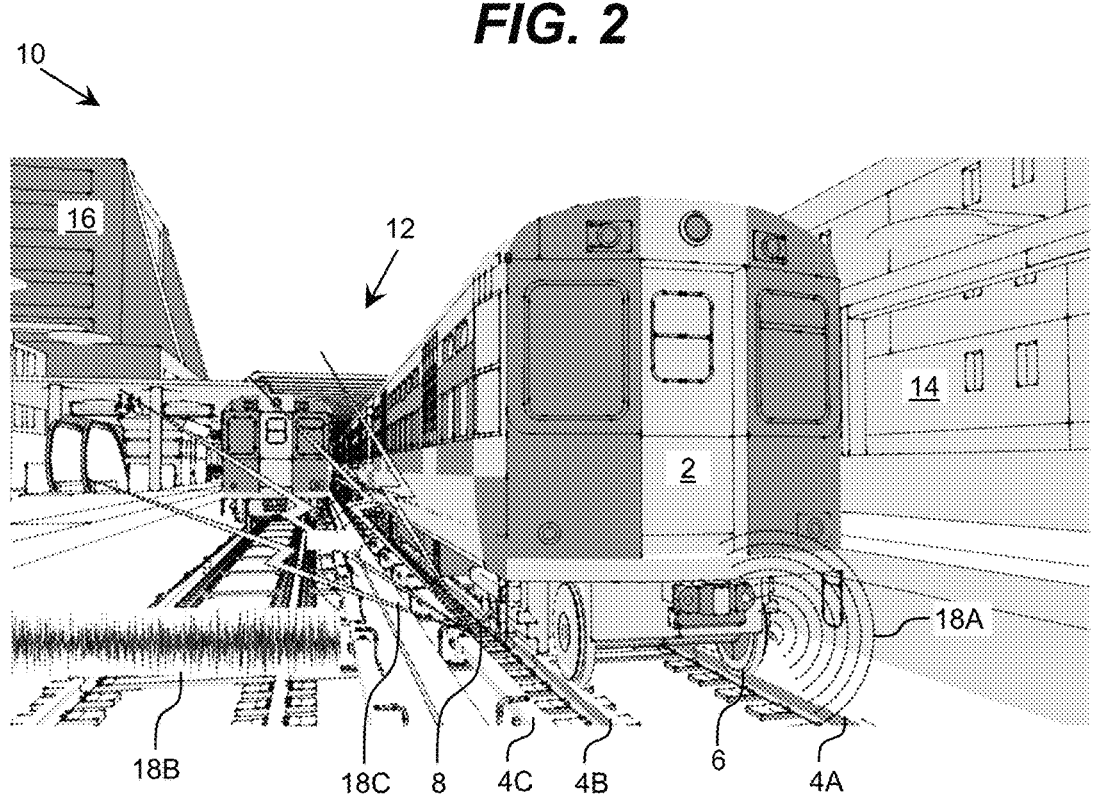
FIG. 2 shows an illustrative environment within which embodiments described herein can be implemented.

FIG. 2 shows an illustrative environment 10 within which embodiments described herein can be implemented. In this case, the environment 10 includes a rail station 12 located near residential housing 14 and a research institution 16. However, it is understood that environment 10 is only illustrative and embodiments can be implemented in environments where any combination of various types of residential housing and/or institutions (e.g., research, manufacturing, offices, etc.) are located.

Regardless, as rail cars 2 are entering and exiting the rail station 12, the rail cars 2 can generate various types of effects. For example, the contact of the wheels 6 with the rails 4A, 4B can produce significant amounts of acoustic effects 18A. To this extent, acoustic effects 18A can be caused by flat spot impacts, out of round wheels, lateral wheel flanging, brakes rubbing, squealing from wheels "crabbing" in turns, rough wheel surfaces (shelling, etc.) running over a rail 4, as well as other sources, such as the movement of the train, the engine, and/or the like. These sources, particularly flat spot impacts, also can transmit energy through the rails 4 into the ground nearby, creating vibration effects 18B that can affect various objects at a significant distance. The distance can depend on various factors, including the type of ground, the presence of other structures lying between the relevant object and the vibrating wheel/rail combination, and/or the like. A transfer function is a mathematical description of a manner and degree to which such energy is transmitted through a medium such as the ground or air. The transfer function will vary for each environment 10 and can vary based on one or more variations in the current conditions (e.g., soil condition, bedrock type, temperature, humidity, and/or the like).

Furthermore, operation of a rail car 2 can produce significant electromagnetic interference 18C. For example, sources of electromagnetic interference 18C can include sparking from poor contact between the third rail 4C and the contact shoe 8, a poor condition of one or more of the electric motors present on the rail car 2, and/or the like. The electromagnetic interference 18C can comprise broad-spectrum radio pulses, which can noticeably interfere with equipment making delicate measurements, operation of radio-frequency based equipment, and/or the like.

Figure 3A:
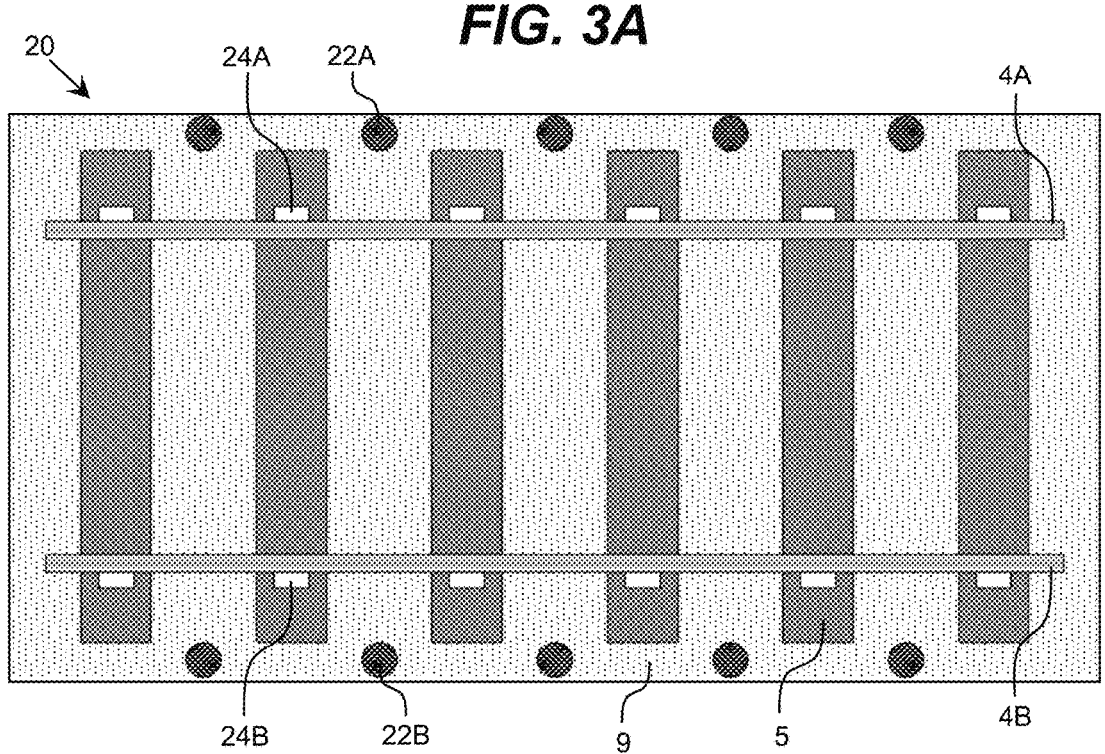
FIGS. 3A and 3B show top and side views, respectively, of an illustrative rail section according to an embodiment.
Figure 3B:
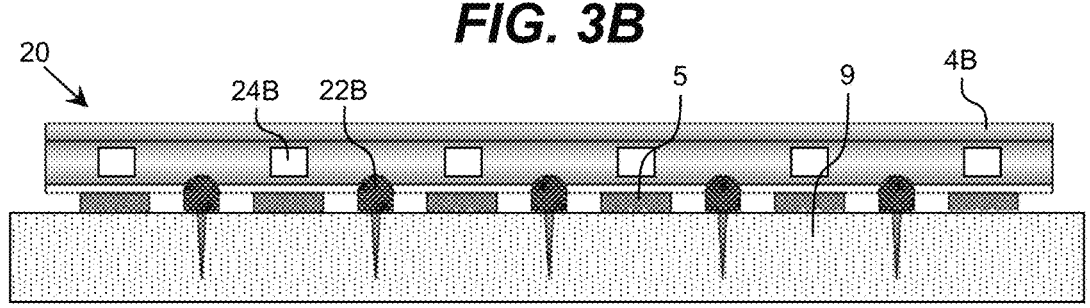

An embodiment of the environment 10, e.g., the rail station 12, includes a plurality of sensors to detect one or more types of the effects 18A-18C. To this extent, FIGS. 3A and 3B show top and side views, respectively, of an illustrative rail section 20 according to an embodiment. While only two rails 4A, 4B are shown, it is understood that embodiments can include a third rail 4C (FIG. 1). In general, the rail section 20 includes the rails 4A, 4B affixed to ties 5, which are supported by a support structure 9. The support structure 9 can comprise any type of support structure typically utilized in the rail industry. For example, the support structure 9 can comprise ballast. Alternatively, the support structure 9 can comprise a concrete foundation into which the ties 5 are set. The rail section 20 can be located within the rail station 12 (FIG. 2), at a location as the rail cars 2 enter and/or exit the rail station 12, or at a location along the main line, during which the rail cars 2 may be traveling at a relatively constant, higher speed. It is understood that the rail section 20 is only illustrative of various configurations that can be implemented in embodiments. Furthermore, it is understood that an environment, such as the environment 10 (FIG. 1), can include any number of rail sections 20 located therein, each of which can be implemented using any combination of various sensors as described herein.

As illustrated in FIGS. 3A and 3B, the rail section 20 includes various sensing devices for acquiring data from rail cars 2 traveling on the rail section 20. To this extent, the rail section 20 can include a plurality of geophones 22A, 22B. Geophones 22A, 22B, such as the SM-24 geophones offered by ION Geophysical Corporation, or the like, detect sounds or vibrations transmitted through the ground. The geophones 22A, 22B are shown placed within the support structure 9 (e.g., ballast), physically separate from the rails 4A, 4B and the ties 5 and can be oriented to detect motion emanating away from the rails 4A, 4B. In this configuration, the geophones 22A, 22B can detect sounds or vibrations transmitted from the rails 4A, 4B through the support structure 9 rather than vibrations detectable at the rails 4A, 4B and/or ties 5. While geophones are discussed as an illustrative sensing device for acquiring data regarding acoustic and/or vibration effects transmitted through the ground, it is understood that other types of sensing devices, such as accelerometers, strain gauges, and/or the like, can be utilized when the acquired data is sufficiently reliable.

As illustrated, each geophone 22A, 22B is located outside of the rails 4A, 4B beyond the extent of the ties 5. Furthermore, each geophone 22A, 22B is centrally located between two adjacent ties 5 in the rail section 20. However, it is understood that these locations are only illustrative of various locations that can be utilized. To this extent, in other embodiments, geophones 22A, 22B can be located further from the rails 4A, 4B, at varying distances from the rails 4A, 4B, at differing locations with respect to the ties 5, and/or the like. While a geophone 22A, 22B is shown located between each of the adjacent ties 5, it is understood that this is only illustrative and any number of geophones 22A, 22B having any periodic or aperiodic arrangement can be utilized. Furthermore, in embodiments, geophones 22A, 22B may be located on only one side of the rails 4A, 4B.

During operation of the rail cars 2, a significant quantity of vibrations at the rails 4A, 4B is absorbed and dispersed through the rails 4A, 4B and the ties 5. In an embodiment, the rail section 20 can further include a plurality of vibration sensing devices 24A, 24B, such as accelerometers, each of which is attached to a rail 4A, 4B using any solution. The vibration sensing devices 24A, 24B can acquire data that can be utilized to monitor the nature and spectrum of vibrations induced in the rails 4A, 4B. Such monitoring can enable the identification of one or more types of defects on the rail car and/or rail wheels. For example, the data can be used to identify wheel flats, which deliver impacts with detectable signatures through the rail 4A, 4B. One solution for identifying one or more types of various defects using vibration data is further described in U.S. Patent Application No. 62/125,232 and Ser. No. 14/996,443, each of which is hereby incorporated by reference.

As illustrated, each vibration sensing device 24A, 24B is attached to a field side of the corresponding rail 4A, 4B. Furthermore, each vibration sensing device 24A, 24B is centrally located over a tie 5 in the rail section 20. While a vibration sensing device 24A, 24B is shown located over each tie 5 on each rail 4A, 4B, it is understood that this is only illustrative and any number of vibration sensing devices 24A, 24B having any periodic or aperiodic arrangement can be utilized. Furthermore, in embodiments, vibration sensing devices 24A, 24B may be located on only one of the rails 4A, 4B. Still, further, one or more vibration sensing devices 24A, 24B can be located on a third rail 4C (FIG. 1), when included. In each case, the vibration sensing devices 24A, 24B can be mounted in a manner that does not interfere with the operation of the wheels, contact shoe, and/or the like, of the rail cars.

It is understood that the use of geophones 22A, 22B and vibration sensing devices 24A, 24B are only illustrative. In embodiments, a rail section 20, or an environment 10 (FIG. 2) including one or more rail sections 20, can further include one or more sensing devices for acquiring data regarding other types of effects that may be generated during the operation of rail cars. For example, an embodiment of the environment 10 can include one or more acoustic sensors for acquiring data regarding a level of sound traveling through the atmosphere. Similarly, an embodiment of the environment 10 can include one or more electromagnetic field (EMF) sensors for acquiring data regarding electromagnetic interference that may be emanating from a rail car. Other illustrative types of effects for which embodiments can acquire effect data include radiation emission, tanker leakage, gas leakage, and/or the like.

The location of some types of sensing devices, such as the acoustic sensors, EMF sensors, and/or the like, can be along the wayside, but beyond the extent of the support structure 9. To this extent, such sensing devices do not need to be affixed to the support structure 9, the rails 4A, 4B, or the ties 5. For example, acoustic sensors can be located a considerable distance from the rails 4A, 4B as shown and described in U.S. Pat. No. 8,326,582, which provides an illustrative distance of approximately 12 feet (e.g., 4 meters) from the rails 4A, 4B. Regardless, any combination of various types and arrangements of sensing devices for acquiring effect data regarding the relevant parameters of a rail car 2 operation can be implemented.

Figure 4:
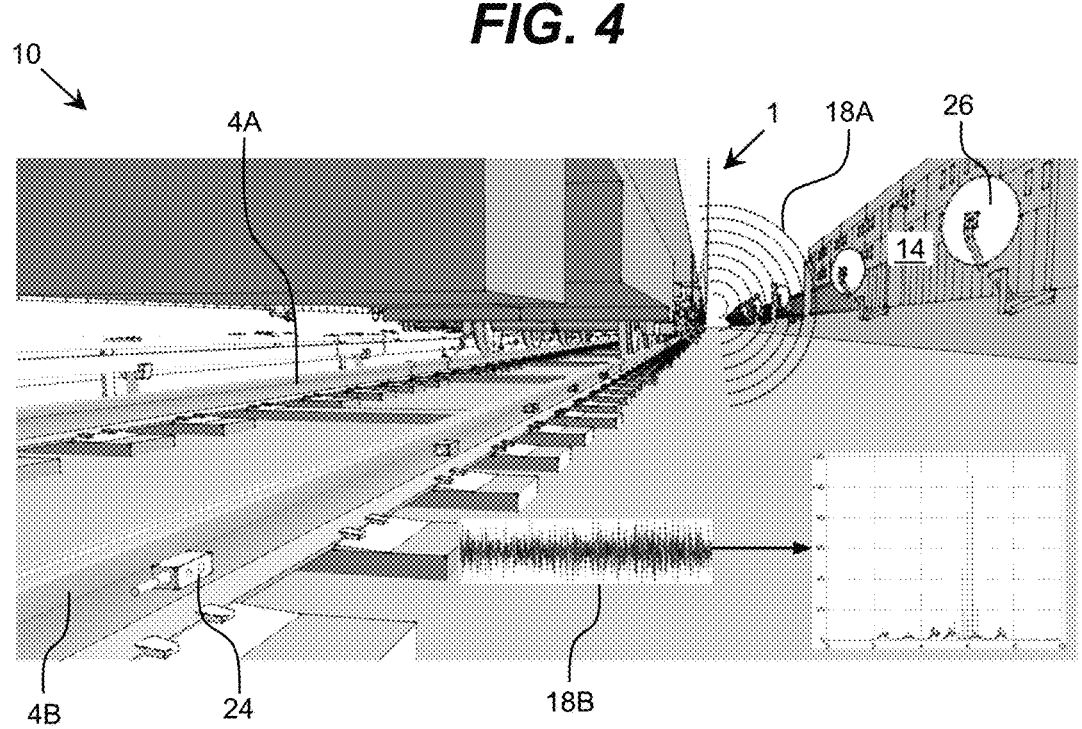
FIG. 4 shows an illustrative environment for acquiring effect data corresponding to operation of a train according to an embodiment.

For example, FIG. 4 shows an illustrative environment 10 for acquiring effect data corresponding to operation of a train according to an embodiment. In this case, the environment 10 includes rails 4A, 4B on which a train 1 is traveling. The rails 4A, 4B are shown passing a residential area 14 located on one side of the rails 4A, 4B. During operation, the train 1 will generate some level of acoustic effects 18A due to its own mechanical operation and its passage over the rails 4A, 4B. Additionally, the train 1 will generate vibration effects 18B through interaction of the wheels of the train 1 with the rails 4A, 4B.

The residential area 14 can have a predetermined acceptable threshold on the level of amplitude for the acoustic effects 18A generated by the train 1. Such a threshold can vary based on the time of day, day of the week, and/or the like. Regardless, to monitor the acoustic effects 18A, the environment 10 is shown including acoustic sensors 26 installed at intervals along the railroad right-of-way, located between the rail 4B and the residential area 14. The acoustic sensors 26 can comprise, for example, directional microphones, which are focused on the rail region to acquire only sound generated by the passing train 1. However, it is understood that the location (with respect to the rail 4B and the residential area 14), spacing, number of, and type of acoustic sensors 26 can vary and the directional microphones are only illustrative. For example, embodiments can acquire effect data on a train 1 prior to its passing an area of concern, such as the residential area 14.

As illustrated, the environment 10 also includes multiple vibration sensing devices 24, which are attached to the rail 4B and acquire data corresponding to the vibration effects 18B generated in the rail 4B as the train 1 passes thereby. While not shown, it is understood that the environment 10 can also include other types of sensing devices, such as one or more geophones, EMF sensors, and/or the like, which can acquire data regarding other types of effects as described herein. Additionally, a similar configuration of sensing devices can be located on the opposite side of the rails 4A, 4B. However, when an area of concern, such as the residential area 14, is only located on one side of the rails, some or all of the sensing devices may not be implemented on both sides of the rails 4A, 4B. In an embodiment, the data acquired by the vibration sensing devices 24 can be correlated (e.g., through experimental data acquired at the environment 10) with the vibrations transmitted to the ground through the rails 4A, 4B and the ties 5, such that the use of geophones may not be required to acquire such data.

Figure 5:
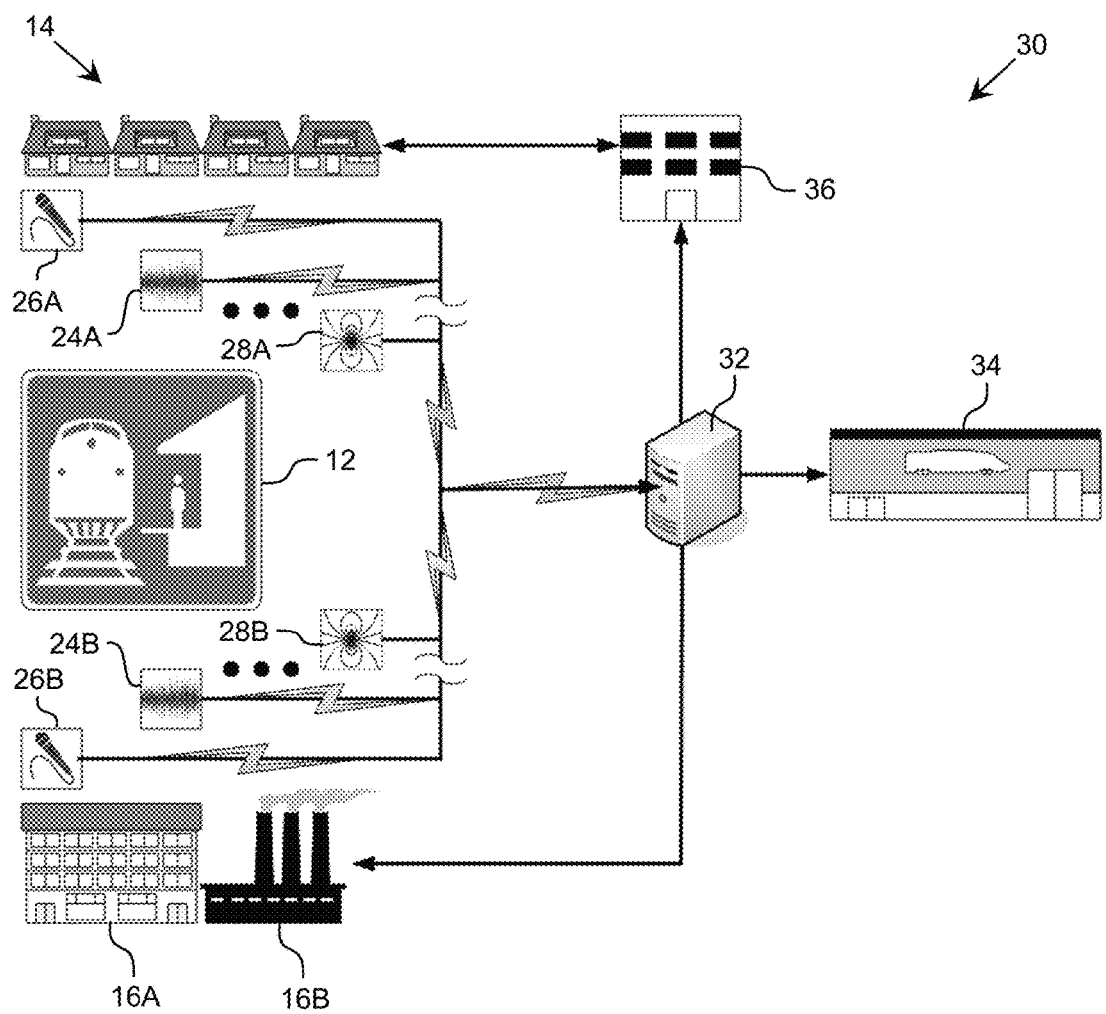
FIG. 5 shows a conceptual diagram of an illustrative operations monitoring system according to an embodiment.

FIG. 5 shows a conceptual diagram of an illustrative operations monitoring system 30 according to an embodiment. The operations monitoring system 30 is implemented in an environment that includes a rail station or line 12 located near various areas of concern. For example, the areas of concern can include a residential area 14, a research institution 16A, and a manufacturing facility 16B (e.g., a nanoscale fabrication facility). However, it is understood that the relative locations of each of these areas/structures 12, 14, 16A, 16B is only illustrative and embodiments of the operations monitoring system 30 can be implemented in environments including other types of areas of concern and/or fewer areas of concern. For example, an area of concern can include any location that includes one or more vibration-sensitive devices and/or at which one or more vibration-sensitive processes are performed. Illustrative vibration-sensitive devices include, for example: machines/devices operating in a manufacturing facility (e.g., a microchip fabrication plant, or other micro-etching/manufacturing facility) in which accuracies on a scale of microns or less are necessary; medical research instrumentation (e.g., nuclear magnetic resonance (NMR), functional magnetic resonance imaging (fMRI), and/or the like); etc. To this extent, an area of concern can comprise any non-rail related location susceptible to being affected by the train operations. Such a location can include, for example, an installation, a group of installations, a region (e.g., an outdoor park)), and/or the like, which may be affected by the train operations.

In any event, the operations monitoring system 30 includes a suitable combination of sensing devices to acquire effect data regarding the operation of the rail vehicles (passenger and/or freight) traveling to/from a rail station or along a rail line. For example, the operations monitoring system 30 is shown including acoustic sensors 26A, 26B, vibration sensing devices 24A, 24B, and EMF sensors 28A, 28B. These sensors are shown located on either side of the rail station/line 12, between the rail station/line 12 and the areas of concern 14, 16A, 16B. Each of the sensing devices 24A, 24B, 26A, 26B, 28A, 28B can acquire effect data for the corresponding type of effect and provide data relating to the acquired effect data (e.g., raw data and/or filtered data) for processing on a computer system 32. Communications between the computer system 32 and the various sensing devices can be implemented using any combination of various communications protocols and any wired and/or wireless transmission solutions.

While the sensing devices 24A, 24B, 26A, 26B, 28A, 28B are generally shown and described as being located at a fixed location with respect to the rail line, it is understood that embodiments of the operations monitoring system 30 can include any combination of sensing devices in any of various locations. For example, an embodiment can include one or more sensing devices affixed to the train (e.g., a locomotive and/or one or more of the rail cars). These sensing devices can provide data regarding one or more effects (e.g., acoustic, vibration, EMF, and/or the like) during operation of the train, for use by the computer system 32 using any solution. For example, sensing devices affixed to rail car(s) of a train can provide data acquired for a corresponding effect to a computer system located on the train, which can subsequently provide the computer system 32 with the corresponding effect data. Furthermore, sensing device(s) affixed to a train can communicate directly with a device of the computer system 32, e.g., which can be located along the rails. Regardless, the computer system 32 can receive data on the effect(s) from sensing device(s) affixed to the train in sufficient time to utilize the data as the train approaches an area of concern. Such effect data can be provided, for example, using a wireless communications solution in response to a request for the data provided by the computer system 32.

The computer system 32 can collect, store, and analyze the data received from the sensing devices. In an embodiment, the computer system 32 analyzes the effect data in real time to allow one or more actions to be taken with respect to an area of concern in response to the effect data. Additionally, the computer system 32 can perform longer-term analysis of the effect data, such as trending analyses, to extract additional information that may not be available or relevant to a real-time analyses. In an embodiment, the computer system 32 can generate and store periodic data reports, such as every second, which can be utilized, for example, to perform longer-term analysis.

In any event, the computer system 32 can process the effect data and determine various conditions and levels of potential environmental effects surrounding the rail station/line 12. The computer system 32 can take any of various types of actions in response to identifying one or more anomalous environmental effects in the effect data received from the sensing devices. These actions can include one or more actions taken to benefit an affected user associated with an area of concern and one or more actions taken as part of the train operations. Depending on the specific type and level of severity of the effect(s), the computer system 32 may transmit an alert, data, and/or action recommendation to one or more of various train and/or non-train contact locations.

In an embodiment, the operations monitoring system 30 includes sensors positioned along a rail before a train will pass an area of concern. In this manner, the computer system 32 can analyze the sensor data and take some action (train or non-train related) prior to the train passing the area of concern. Furthermore, the operations monitoring system 30 can include sensors positioned between the section of rail creating the most effects for an area of concern and the area of concern. The computer system 32 can process data acquired at this section to improve future predictions, address local problems (e.g., with the rails), confirm effect levels, and/or the like. In an embodiment, the computer system 32 can correlate effect levels detected at a location of the rail before the train passes an area of concern with effect levels anticipated at the location of the rail as the train passes the area of concern to make one or more predictions regarding the effects for the area of concern and initiate one or more actions, if necessary.

The actions can include one or more train operation related actions. For example, after analyzing acoustic signal data, the computer system 32 may determine that bearings on a particular rail car/train are failing. In response, the computer system 32 can transmit an advisory message to a railroad shop 34 informing the railroad shop 34 of the fault. In response, the railroad shop 34 can schedule and perform the necessary service on the railroad vehicle(s) in a timely manner.

In response to determining that a noise level being generated by a train exceeds an acceptable threshold, the computer system 32 can transmit data and/or alerts to one or more affected users associated with an area of concern. For example, the computer system 32 can transmit a message for processing at a central location 36. The central location 36 can comprise any of various individuals or organizations responsible for the area of concern, such as an area of housing 14. For example, the central location 36 can comprise a customer service center for a railroad, a local government office (e.g., a mayor), a private organization (e.g., a neighborhood association), and/or the like. The central location 36 can take one or more actions in response to receiving the information from the computer system 32. For example, the central location 36 can exchange information with individuals or organizations associated with the residential housing 14, verify the noise levels, and/or the like. Additionally, the central location 36 can provide feedback for use by the computer system 32 and/or the entity managing the computer system 32, e.g., to make additional recommendations, provide additional data regarding noise levels and when they exceed acceptable limits for the area, and/or the like. For example, when noise levels are frequently found to be exceeding a threshold level during a particular time period (e.g., overnight), the computer system 32 can instruct trains (at least of the type found to be exceeding the threshold level) operating during this time to reduce their speed. In an embodiment, the computer system 32 can communicate directly with multiple affected users for an area of concern. For example, the computer system 32 can communicate with residents of the residential housing 14 using text messages, an app, a recorded message, and/or the like.

In response to determining that vibration effect data exceeds an acceptable level, the computer system 32 can provide data and/or an alert for use by one or more vibration sensitive facilities, such as a research institution 16A or a manufacturing facility 16B. In response, the vibration sensitive facility can initiate one or more actions, such as altering a schedule for performing a vibration sensitive process, shutting down or pausing a vibration sensitive process, and/or the like. Such notice can allow such changes to be performed in a minimally disruptive manner, without adversely impacting the quality of the results obtained from the process.

In an embodiment, the computer system 32 can use an acceptable level provided by the corresponding vibration sensitive facility 16A, 16B. For example, the vibration sensitive facility may have a particular process scheduled for a certain date, time, and duration. The vibration sensitive facility can provide information on a maximum vibration that can be tolerated and the corresponding time period for use by the computer system 32. In response to determining excessive vibrations may be generated during the restricted time, the computer system 32 can instruct a train to adjust its speed (e.g., by slow down or speeding up), temporarily adjust a speed limit for a relevant portion of tracks, and/or the like. In response to identifying excessive vibrations, the computer system 32 can send an alert to the vibration sensitive facility, instruct the train to halt operations, and/or the like. Determining which course(s) of action to take can be dependent on an agreement between the train operator and the vibration sensitive facility and the relative costs for each party to take a respective action.

To this extent, the operations monitoring system 30 of FIG. 5 enables a train operator to acquire data both for its own use, e.g., maintaining equipment, operating crossing gates and other grade crossing protective systems, as well as providing information to non-rail entities that can be affected by the rail operations, such as nearby residential areas, vibration sensitive equipment, and/or the like. In this manner, the train operator can work in conjunction with its community to reduce an adverse impact the train operations have on the community and businesses located in the surrounding area.

The computer system 32 can utilize any combination of various processes for analyzing the effect data provided by the sensing devices. As the effect data can be utilized for multiple purposes for both the train operator as well as the non-rail entities, the effect data processing can be configured to look for and identify conditions, events, and/or the like, which may be of interest only to a subset of all of the interested parties. To this extent, the effect data processing may yield different results depending on the interested party. Moreover, as different type of effect data (acoustic, vibration, electromagnetic, infrared, etc.) may enable different aspects of the same object or phenomenon to be identified, embodiments of the computer system 32 can include an ability to use cross-modality analyses to produce information and action decisions which may be difficult or impossible to produce using effect data acquired for only a single modality.

For example, use of effect data acquired by the acoustic sensors 26A, 26B to monitor a level of acoustic effects 18A (FIG. 4) being generated by a train 1 (FIG. 4) can be utilized by the computer system 32 to provide alerts when the acoustic level exceeds a maximum desired level. However, to remedy the source of the acoustic effects, which is often an objective of the operations monitoring system 30, the computer system 32 needs to identify a source of the excess acoustic effects 18A and notify the proper entity capable of taking action to reduce the acoustic effects 18A caused by the source.

One common source of loud noises from a railcar is a slid flat, or wheel flat. The computer system 32 can analyze acoustic signals produced by a railcar to detect particular faults, such as worn bearings. To this extent, one such solution is described in U.S. Pat. No. 8,326,582, which is hereby incorporated by reference. However, identification by the computer system 32 of wheel flats from the acoustic signature is more difficult as there are other potential sources of impact sounds in rail environments. Furthermore, identification by the computer system 32 of a particular rail vehicle and rail wheel on the rail vehicle that is slid flat also is more difficult. Even if such analysis can be done, the required computation and margin of error would likely both be significant. In contrast, as described in U.S. Patent Application No. 62/125,232 and Ser. No. 14/996,443, each of which was previously incorporated by reference, vibration sensing devices properly spaced along a rail can provide data, which when combined, can produce a clear signature of a wheel flat on a rail wheel. As described therein, due to the timing of the passage of the wheels, the vibration signature also can be used to clearly identify the wheel with the flat.

In an embodiment, the computer system 32 can perform cross-statistical analysis using effect data acquired from multiple sources/multiple data populations to identify condition patterns not apparent from a single source data analysis.

For example, by combining acoustic effect data with vibration effect data (e.g., the vibration signatures), the computer system 32 can determine that a particular rail vehicle is producing excessive noise due to a slid flat on a particular wheel. Furthermore, the computer system 32 can determine if the source of the noise is something other than a slid flat (e.g., when the vibration signature does not include any anomalies corresponding to a slid flat). In either case, the computer system 32 can provide this information for use by the railroad shop 34 in addressing the source of the excessive noise.

The computer system 32 can use the same combination of acoustic and vibration effect data to rule out, or identify, other causes. For example, a wheel flat may be present, but not be causing sufficient noise to exceed the threshold noise level. In this case, the computer system 32 can combine analysis of the acoustic effect data acquired by the acoustic sensing devices 26A, 26B with the vibration effect data acquired by the vibration sensing devices 26A, 26B to determine that the excessive sound remains regardless of the presence of a particular rail vehicle. In this case, the computer system 32 can identify a particular location or locations on the rail as a source of the excessive sound. In response, the computer system 32 can determine that excessive wear or damage to the section(s) of rail are responsible for the noise, and therefore send information to rail maintenance personnel at the railroad shop 34, rather than to railcar shop personnel. When the railroad operator is not responsible for the rails, a responsible railroad or transit agency can be alerted by the computer system 32.

Other phenomena which can be detected more easily by multiple modalities include flanging and hunting of the truck, bearing wear, brake malfunction, and others. It is understood that the computer system 32 can perform many other similar analyses using many other combinations of various types of sensors to produce independent data from which may be derived detailed and reliable information on various elements of the train-wheel-rail system. To this extent, embodiments can use any of various combinations of various types of sensors for these purposes.

Additionally, the analysis of effect data by the computer system 32 is not necessarily limited to individual events, or small time frames. For example, the computer system 32 can analyze acoustic effect data acquired by the acoustic sensing devices 26A, 26B over a period of time. Such analysis can be particularly useful when combined with operating data which tracks, for example, when the same train cars are passing through the operations monitoring system 30. In this case, the computer system 32 can process the combined acoustic effect data and operating data to notice long-term trending changes for a given rail vehicle/train.

The trending analysis can enable the computer system 32 to predict when a monitored parameter is going to pass its threshold. As a result, the computer system 32 can initiate one or more actions ahead of such an event. For example, the computer system 32 can alert and transmit repair or service information to the railroad shop 34 before the threshold is actually reached. This approach, generally called predictive health maintenance (PHM), can be highly cost-effective and can result in increased overall safety when utilized in transportation systems. Additionally, the computer system 32 also can take one or more additional actions, such as slowing a speed of a train to avoid acoustic and/or vibration effects from becoming excessive, provide a schedule or advance notice to a vibration sensitive entity 16A, 16B identifying when excessive vibrations may be anticipated, and/or the like.

In an embodiment, the computer system 32 can synchronize various data acquisition equipment in the operations monitoring system 30 using a network based synchronization solution. For example, the computer system 32 can send a network based synchronization time stamp, which synchronizes all of the data acquisition devices, such as various sensor nodes, as well as data processing devices, such as computers, analysis servers, and/or the like. Furthermore, embodiments of the operations monitoring system 30 can utilize distributed data storage and transmission to reduce a total amount of data and insure that the network traffic is optimized. Furthermore, embodiments of the operations monitoring system 30 can include a redundant data collection/data storage architecture.

As described herein, the computer system 32 can determine various alarm conditions and/or actions to take based on, for example, a threshold being exceeded. In an embodiment, the computer system 32 utilizes multi-level smart alarms to allow intelligent real-time data thresholds based alarms, predictive data analysis based alarms, and/or fuzzy expert system based alarms, to provide advanced warning where train operation may be deemed to excessively interfere with the surrounding environment. In particular, a threshold alarm sets one or more values that are used to trigger certain alarms. Predictive data analysis can operate similarly based on some statistical projection of a future state based on the effect data. An expert system can use a variety of methods for acquiring an understanding of the connection between an event and its measured effects, which can be utilized in determining an alarm condition.

Many factors present in a particular operating environment can affect the analyses described herein. To this extent, an embodiment of the operations monitoring system 30 can acquire and utilize information regarding the operating environment to determine the necessity for action based on the results of the analyses. In an embodiment, the computer system 32 to acquire data regarding an intensity of vibration effects 18B at or near the rails 4A, 4B and convert these measurements into an accurate evaluation of the intensity of vibration effects that will be seen at a vibration sensitive facility, such as the manufacturing facility 16B. Furthermore, the computer system 32 can compare the evaluated vibration effects with an acceptable vibration level (which could vary based on time/day) for the vibration sensitive facility 16A, 16B to determine whether any action is required.

Determination of whether vibration effects 18B of a particular level at the rails 4A, 4B will be less than or greater than a threshold level when the vibration effects 18B reaches the foundation of the vibration sensitive facility 16A, 16B is nontrivial. Even in air of uniform density and composition, the reduction of vibration (sound) with distance is a cubic, not squared, function. In a complex environment, such as the ground and subsurface, which are heterogeneous in both composition and mechanical construction, the relationship between distance and the amplitude of a transmitted vibration can be a tremendously complex function called a transfer function. Furthermore, as the ground can be or contain resonant structures, the intensity of vibration effects can increase at some distances. To this extent, an embodiment empirically determines the transfer function for a given operating environment.

Figure 6A:
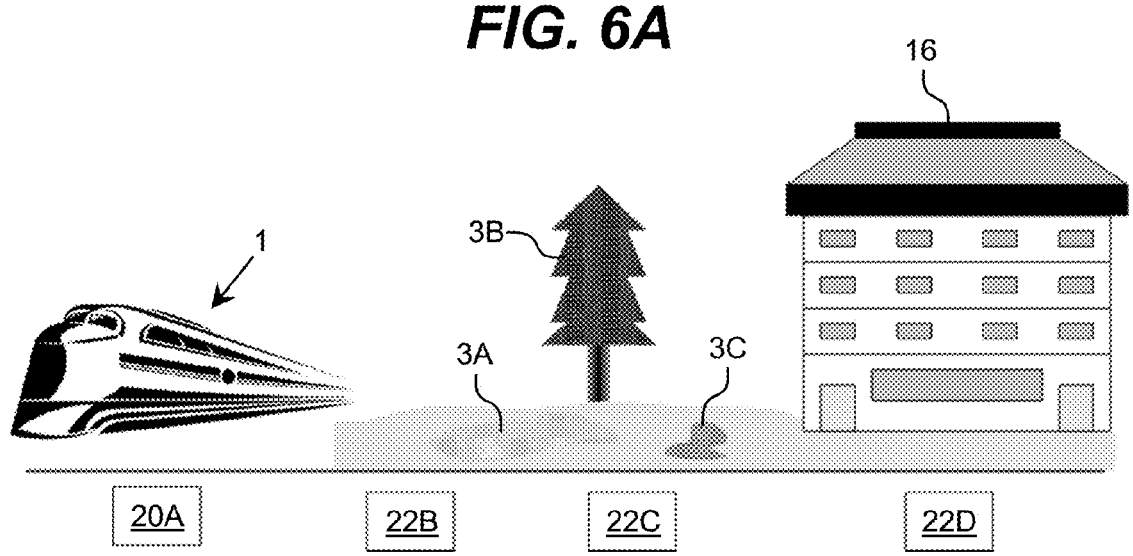
FIGS. 6A and 6B show side and top views, respectively, of illustrative operating environments according to embodiments.
Figure 6B:
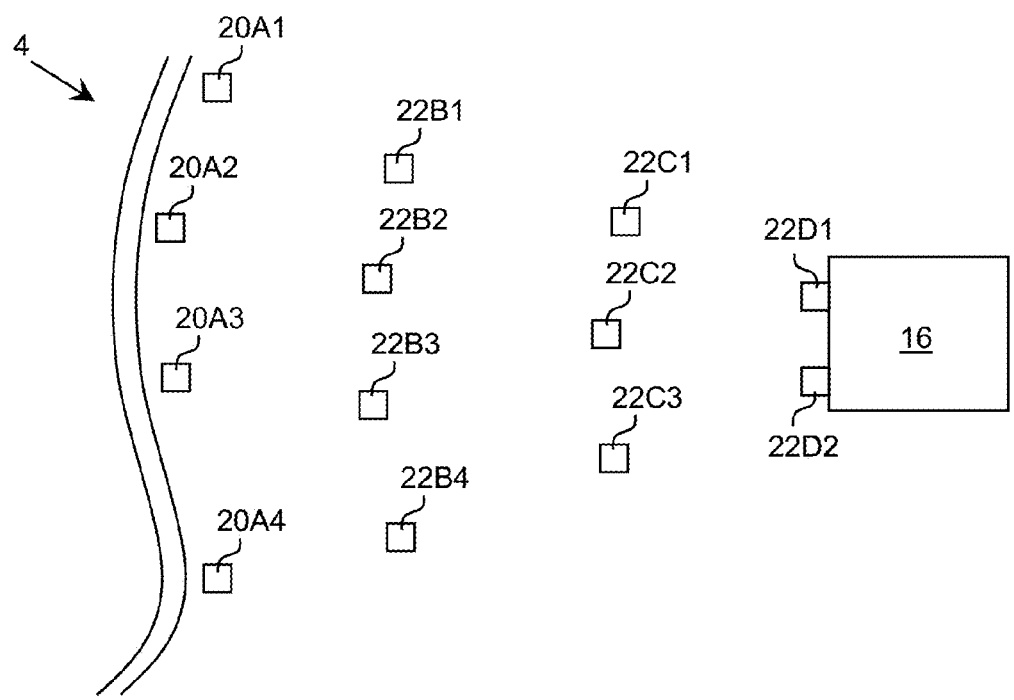

For example, FIGS. 6A and 6B show side and top views, respectively, of illustrative operating environments according to embodiments. As illustrated, in each environment, a train 1 (FIG. 6A) can be traveling along rails 4 (FIG. 6B), which are located within a known distance from a vibration sensitive facility 16. As shown in FIG. 6A, vibration measurements can be acquired adjacent to the rails 4, e.g., using a sensor configuration 20A, which can be similar to the rail section 20 shown in FIGS. 3A and 3B. Furthermore, additional vibration sensing devices 22B-22C, such as geophones, can be located between the rails 4 and the vibration sensitive facility 16. A final vibration sensing device 22D can be located on, below, or adjacent to the vibration sensitive facility 16.

An environment between a train 1 and a vibration sensitive facility 16 can include various vibration altering structures 3A-3C. The particular combination and arrangement of these structures will be unique to each environment, and may vary over time. For example, illustrative vibration altering structures can include a rock formation 3A, a root system for one or more trees 3B, an underground water formation 3C, and/or the like. Additionally, vibration altering structures can include manmade structures such as underground piping or wiring, buildings, walls, and/or the like.

As illustrated in FIG. 6B, for a given section of the rails 4 and vibration sensitive facility 16, multiple sensor configurations 20A1-20A4 can be located at various locations along the rails 4. The locations of the sensor configurations 20A1-20A4 can be selected using any solution. For example, the location of sensor configuration 20A1 can correspond to a first location at which the rails 4 are within a predetermined distance from the vibration sensitive facility 16, and the location of sensor configuration 20A4 can correspond to a location at which increased vibrations may be generated (e.g., due to a curve in the rails 4). The locations of the sensor configurations 20A2, 20A3 can be selected to provide data at selected distances while the rails 4 are within the predetermined distance form the vibration sensitive facility 16. Additionally, depending on a size and/or orientation of the vibration sensitive facility 16 to the rails 4, multiple vibration sensing devices 22D1, 22D2 can be located near or attached to the vibration sensitive facility 16.

The various vibration sensing devices 22B1-22C3 are shown placed in locations that fan out from the vibration sensitive facility 16. Furthermore, additional vibration sensing devices 22B1-22C3 can be utilized as the distance from the vibration sensitive facility 16 increases. However, it is understood that this only illustrative, and a particular configuration of sensing devices can be selected based on numerous factors, including a relative orientation of and distance between the tracks 4 and the vibration sensitive facility 16, as well as the presence or absence of various vibration altering structures 3A-3C, which may be located between the tracks 4 and the vibration sensitive facility 16.

It is understood that the number of sensing devices shown in FIGS. 6A and 6B are only illustrative and any number of sensing devices can be utilized in any configuration. In an embodiment, only sensing devices located on or near the rails 4 and on or near the vibration sensitive facility 16 are utilized. In another embodiment, some or all of the sensing devices shown can be temporarily placed and subsequently removed after acquiring sufficient vibration effect data to generate a suitable transfer function. However, it is understood that periodic placements of vibration sensing devices can be used to update and/or confirm the accuracy of the transfer function. Such placements can be performed on an ongoing basis and/or in response to an excess vibration event, which was not successfully anticipated.

Additionally, while FIGS. 6A and 6B are shown and described in conjunction with determining appropriate transfer functions for vibration effect data, it is understood that a similar process can be utilized to generate transfer functions for other types of sensor data, including acoustic, EMF, and/or the like.

Figure 7A:
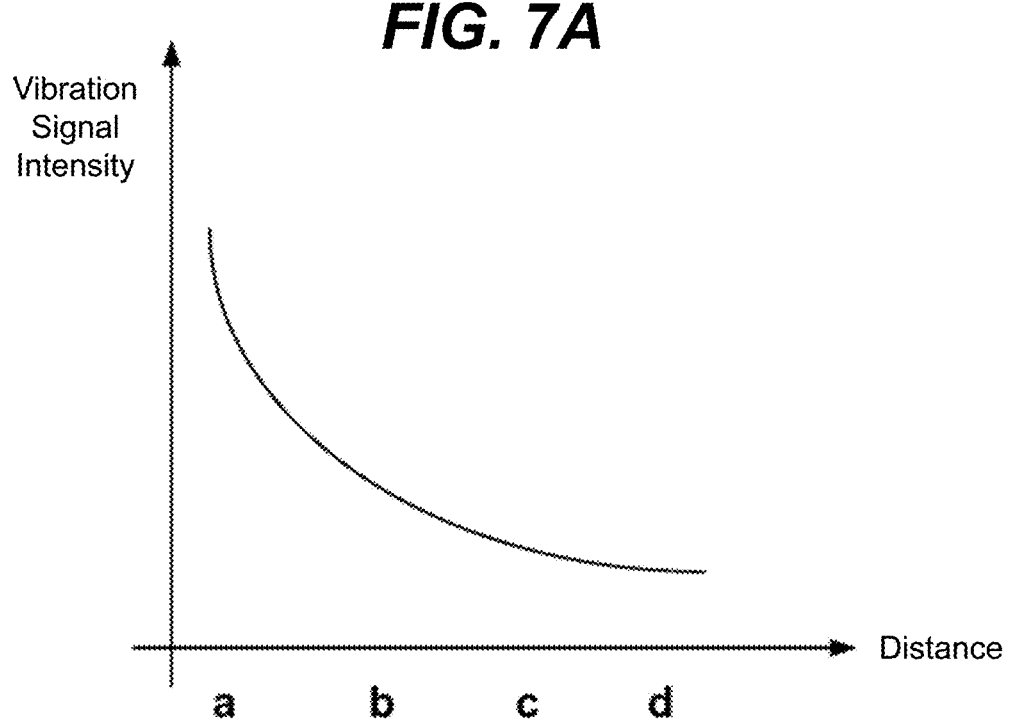
FIGS. 7A and 7B show illustrative transfer functions according to embodiments.
Figure 7B:
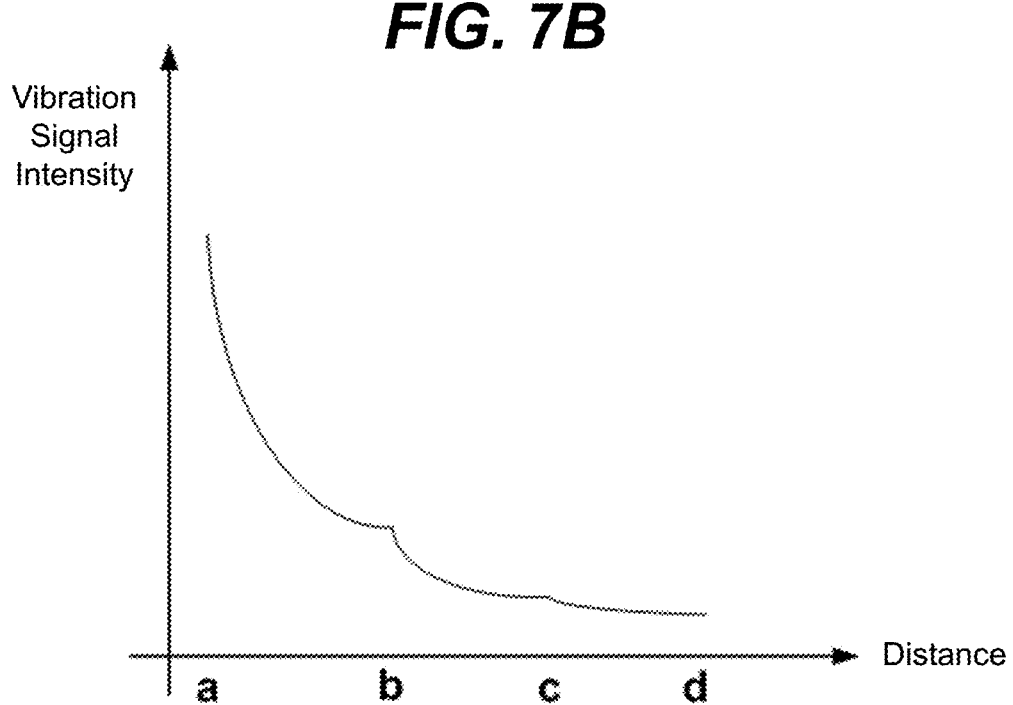

FIGS. 7A and 7B show illustrative transfer functions according to embodiments. Each transfer function can model the conduction of a particular type of effect in the corresponding environment. To this extent, the computer system 32 (FIG. 5) can obtain (e.g., generate) and use a transfer function to model earth-based conduction, infrastructure-based conduction, air-based conduction, energy reflections from surrounding areas, and/or the like, for an area of concern. The computer system 32 can use the transfer function(s) to model the corresponding conduction before a train reaches the area of concern, where undue levels of train-induced effects can cause disruption and/or permanent damage in extreme conditions.

For example, each transfer function shown in FIGS. 7A and 7B can be derived from vibration effect measurements acquired from various distances from the rails 4 (FIG. 6B). For example, each distance a, b, c, d, can correspond to a location of the sensing devices 20A, 22B, 22C, 22D shown in FIG. 6A. The vibration effect measurements can correspond to actual train traffic, and/or vibrations induced using other approaches, such as by a drop hammer to generate input shock and vibration. Based on the measurement data, a fitting equation, e.g., a dampening exponential, can be derived. FIG. 7A shows a uniform dampening exponential, which can be expected when the area between the rails 4 and the vibration sensitive facility 16 is reasonably uniform. FIG. 7B shows a more erratic dampening exponential, which can result when the composition and structure of the ground between the rails 4 and the vibration sensitive facility 16 is not uniform. Regardless, the computer system 32 (FIG. 5) can utilize a suitable transfer function for a particular location along the rails 4 to determine an amount of vibration anticipated at the vibration sensitive facility 16.

In an embodiment, the computer system 32 can perform data modeling to properly process the data such that sample noise, background noise, etc., does not interfere with the decision making and data quality. For example, the computer system 32 can incorporate multi-second running averages of the input vibration data, which can reduce background traffic related noise.

Figure 8:
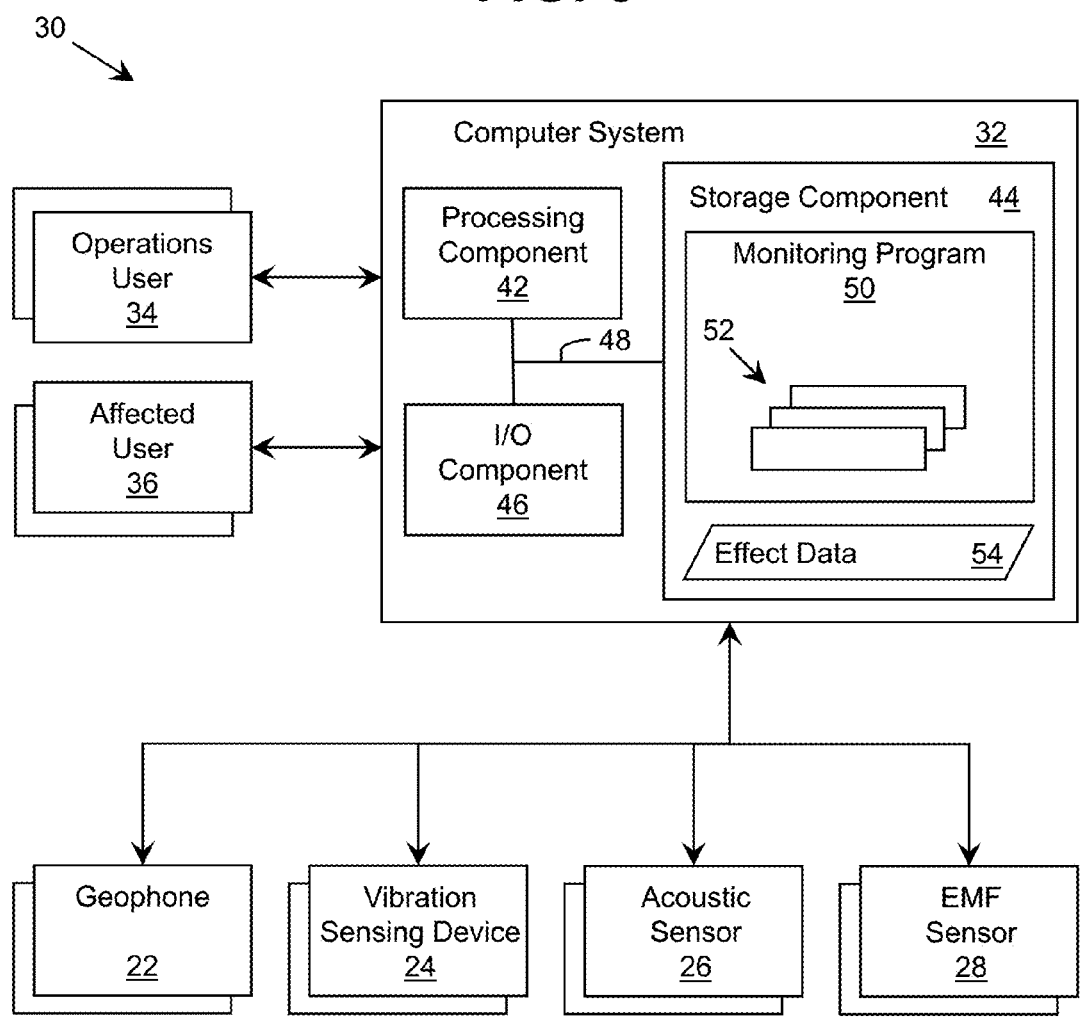
FIG. 8 shows an illustrative environment for monitoring rail operations according to an embodiment.

As described herein, the computer system 32 can receive and process various types of sensor data and provide information, including alerts, to various users relating to operations of the rail system or affected by the operations of the rail system. In this manner, the computer system 32 can provide a centralized system for evaluating sensor data for both internal as well as external issues arising from operation of the trains. FIG. 8 shows an illustrative environment 30 for monitoring rail operations according to an embodiment. To this extent, the environment 30 includes a computer system 32 that can perform a process described herein in order to monitor the rail operations and provide information to one or more operations users 34 and one or more affected users 36. In particular, the computer system 32 is shown including a monitoring program 50, which makes the computer system 32 operable to monitor the rail operations by performing a process described herein.

The computer system 32 is shown including a processing component 42 (e.g., one or more processors), a storage component 44 (e.g., a storage hierarchy), an input/output (I/O) component 46 (e.g., one or more I/O interfaces and/or devices), and a communications pathway 48. In general, the processing component 42 executes program code, such as the monitoring program 50, which is at least partially fixed in storage component 44. While executing program code, the processing component 42 can process data, which can result in reading and/or writing transformed data from/to the storage component 44 and/or the I/O component 46 for further processing. The pathway 48 provides a communications link between each of the components in the computer system 32. The I/O component 46 can comprise one or more human I/O devices, which enable a human user (e.g., one or more of the operations users 34) to interact with the computer system 32 and/or one or more communications devices to enable a system user (e.g., one or more of the users 34, 36) to communicate with the computer system 32 using any type of communications link. To this extent, the monitoring program 50 can manage a set of interfaces (e.g., graphical user interface(s), application program interface, and/or the like) that enable human and/or system users 34, 36 to interact with the monitoring program 50. Furthermore, the monitoring program 50 can manage (e.g., store, retrieve, create, manipulate, organize, present, etc.) the data, such as effect data 54, using any solution.

In any event, the computer system 32 can comprise one or more general purpose computing articles of manufacture (e.g., computing devices) capable of executing program code, such as the monitoring program 50, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the monitoring program 50 can be embodied as any combination of system software and/or application software.

Furthermore, the monitoring program 50 can be implemented using a set of modules 52. In this case, a module 52 can enable the computer system 32 to perform a set of tasks used by the monitoring program 50, and can be separately developed and/or implemented apart from other portions of the monitoring program 50. As used herein, the term "component" means any configuration of hardware, with or without software, which implements the functionality described in conjunction therewith using any solution, while the term "module" means program code that enables a computer system 32 to implement the actions described in conjunction therewith using any solution. When fixed in a storage component 44 of a computer system 32 that includes a processing component 42, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 32.

When the computer system 32 comprises multiple computing devices, each computing device can have only a portion of the monitoring program 50 fixed thereon (e.g., one or more modules 52). However, it is understood that the computer system 32 and the monitoring program 50 are only representative of various possible equivalent computer systems that may perform a process described herein. To this extent, in other embodiments, the functionality provided by the computer system 32 and the monitoring program 50 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 32 includes multiple computing devices, the computing devices can communicate over any type of communications link. Furthermore, while performing a process described herein, the computer system 32 can communicate with one or more other computer systems, such as one or more of the users 34, 36, and/or one or more of various types of sensing devices 22, 24, 26, 28, using any type of communications link. Regardless, each communications link can comprise any combination of various types of optical fiber, wired, and/or wireless links; comprise any combination of one or more types of networks; and/or utilize any combination of various types of transmission techniques and protocols.

While illustrative aspects of the invention have been shown and described primarily in conjunction with transit rail systems for transporting people, which often are implemented in close proximity to residential housing sensitive to acoustic effects and various vibration sensitive facilities, it is understood that embodiments can be directed to freight rail monitoring. For example, a sensor system can be deployed to a section of rails that are close to an area of concern and provide information regarding the operation of freight trains for use by affected individuals. In this case, additional types of sensing devices can be deployed and utilized. For example, the sensors can include contaminant sensors, such as chemical sensors, which can identify when freight is emitting a contaminant (e.g., a chemical leak, an objectionable smell, and/or the like).

Additionally, a group of sensors described herein can be deployed some distance from a railyard, and include a mechanism for detecting and verifying passage of cars, such as wheel switches. In this case, the sensors can acquire data and measure parameters mostly associated with key maintenance issues and provide a clear diagnostic picture for each passing railcar. When combined with existing in-ground and wayside measurement systems, such sensors can increase the automation of the maintenance of railcars. For example, a multisensory approach to examining the railcars could provide information on the condition of nearly all components ranging from the wheels and bearings to the couplers.

One or more aspects of the performance of a train may vary based on its speed. For example, the noise produced varies in both volume and frequency as the train speeds up. In an embodiment, a monitoring system described herein is integrated with a positive train control (PTC) system. Incorporating a monitoring system described herein into a PTC system can enable the PTC system to evaluate whether slowing down, or speeding up, a train would improve noise or vibration production through areas of concern. For example, with vibration transmission, the transfer function may be highly frequency dependent, and thus changing the dominant frequencies of the train's signature (through altering the speed) may drastically reduce the transmitted vibration at a given range, even though the absolute energy contained in the vibration at the rail may be significantly greater.

In still other embodiments, a monitoring system described herein can be deployed and used in conjunction with other non-rail related operations that can generate significant noise, vibration, EMF, and/or other types of effects. An illustrative application includes an airport, where arriving and departing planes may generate vibration and/or acoustic effects. In this case, the monitoring system can inform affected users when departures and/or arrivals will be occurring in certain directions more prone to create increased noise or vibration effects. Other illustrative applications can include other types of transportation, such as locations with helicopters, large ships, and/or the like. Furthermore, an illustrative application can include a launch area for a space-bound vehicles. In this case, the monitoring system can inform affected users of a scheduled launch.

Other applications can be directed to non-vehicular environments where noise, vibration, EMF, and/or the like, effects can be generated in a manner that is predictable and can be communicated to affected users. For example, an illustrative application can comprise a construction area, where drilling or other vibration or acoustic interfering actions can be scheduled and communicated. Still another illustrative application includes areas in which wind turbines are deployed (e.g., for protecting blossoms for certain crops from being damaged by a frost). In this case, the sensors can include temperature sensors, and the monitoring system can warn individuals when the temperatures and crops are such that the wind turbines are likely to be utilized.

In each of these applications, the computer system 32 (FIG. 8) can analyze the effect data to both initiate one or more actions for an affected user and/or to initiate one or more actions as part of managing the operations. For example, the acoustic and/or vibration signatures can be analyzed to evaluate the operational status of one or more of the components generating the acoustic and/or vibration effects. Such analysis can include evaluating the acoustic and/or vibration signatures for unexpected deviations from the acoustic and/or vibration signatures for properly operating equipment. In response to identifying such a deviation, the computer system 32 halt a process, schedule maintenance, and/or the like.

While shown and described herein as a method and system for monitoring operations using various types of sensor data, it is understood that aspects of the invention further provide various alternative embodiments. For example, in one embodiment, the invention provides a computer program fixed in at least one computer-readable medium, which when executed, enables a computer system to monitor operations using the sensor data. To this extent, the computer-readable medium includes program code, such as the monitoring program 50 (FIG. 8), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as the monitoring program 50 (FIG. 8), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for monitoring operations using various types of sensor data. In this case, the generating can include configuring a computer system, such as the computer system 32 (FIG. 5), to implement the method of monitoring operations using the sensor data. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for monitoring operation of a train, the system comprising:
   a first set of sensors for acquiring effect data of a first type; and
   means for monitoring operation of the train using the effect data acquired by the first set of sensors, wherein the means for monitoring includes:
   identifying an acceptable threshold for an area of concern for effects of the first type, wherein the area of concern is a non-rail related location susceptible to being affected by the train operation;

analyzing the effect data of the first type to determine whether the acceptable threshold will be exceeded for the area of concern;

in response to determining the acceptable threshold will be exceeded, initiating an affected user action;

analyzing the effect data of the first type to determine whether a train operation action is required; and initiating the train operation action in response to determining the train operation action is required.

2. The system of claim 1, wherein the effect data of the first type corresponds to acoustic effects.

3. The system of claim 1, wherein the effect data of the first type corresponds to vibration effects and the first set of sensors includes geophones placed in ballast and oriented to detect motion emanating away from rails used by the train.

4. The system of claim 1, wherein the effect data of the first type corresponds to vibration effects and the first set of sensors includes vibration sensing devices physically attached to at least one rail utilized by the train.

5. The system of claim 1, wherein the identifying includes receiving the acceptable threshold for the area of concern and a time frame for the acceptable threshold from an affected user associated with the area of concern.

6. The system of claim 5, wherein the affected user action includes adjusting a speed of the train.

7. The system of claim 1, wherein the affected user action includes providing information regarding the train operations for use by at least one affected user associated with the area of concern.

8. The system of claim 1, wherein the area of concern is one of: a research institution or a manufacturing facility.

9. The system of claim 1, wherein the train operation action includes scheduling a rail vehicle on the train for servicing.

10. The system of claim 1, further comprising a second set of sensors for acquiring effect data of a second type, wherein the second type is distinct from the first type, wherein the means for monitoring further includes combining the effect data of the first type and the second type to identify a source of excessive effects of the first type.

11. A system for operating a train, the system comprising:
a first set of sensors for acquiring acoustic effect data based on acoustic effects generated by the train;
a second set of sensors for acquiring vibration effect data based on vibration effects generated by the train; and
means for managing operation of the train using the acoustic and vibration effect data, wherein the means for managing includes:
determining an acceptable threshold for an area of concern for vibration effects, wherein the area of concern is a non-rail related location susceptible to being affected by vibration effects;
analyzing the vibration effect data to determine whether the acceptable threshold will be exceeded for the area of concern;
in response to determining the acceptable threshold will be exceeded, initiating an affected user action;
analyzing the vibration and acoustic effect data to determine whether a train operation action is required; and
initiating the train operation action in response to determining the train operation action is required.

12. The system of claim 11, wherein the first set of sensors includes geophones embedded in a support structure for the rails and ties.

13. The system of claim 12, wherein the first set of sensors further includes vibration sensing devices physically attached to at least one of the rails.

14. The system of claim 11, wherein the affected user action includes adjusting a speed of the train.

15. The system of claim 11, wherein the area of concern is one of: a research institution or a manufacturing facility.

16. A system for managing vibration-inducing operations, the system comprising:
a set of sensors for acquiring vibration effect data at a plurality of locations relating to the vibration-inducing operations and a first area of concern affected by the vibration-inducing operations; and
means for managing the vibration-inducing operations using the vibration effect data, wherein the means for managing includes:
determining a first acceptable threshold for the first area of concern for vibration effects;
analyzing the vibration effect data to determine whether the first acceptable threshold will be exceeded for the first area of concern;
in response to determining the first acceptable threshold will be exceeded, initiating an affected user action, wherein the affected user action includes at least one of: adjusting the vibration-inducing operations to avoid exceeding the first acceptable threshold at the first area of concern or informing a first affected user associated with the first area of concern;
analyzing the vibration effect data to determine an operational status of the vibration-inducing operations; and
initiating a vibration-inducing operation action in response to determining the operational status is impaired.

17. The system of claim 16, further comprising a set of sensors for acquiring acoustic effect data at a plurality of locations relating to the vibration-inducing operations and a second area of concern affected by the acoustic effects generated by the vibration-inducing operations, wherein the means for managing further includes:
determining a second acceptable threshold for the second area of concern for acoustic effects;
analyzing the acoustic effect data to determine whether the second acceptable threshold will be exceeded for the second area of concern;
in response to determining the second acceptable threshold will be exceeded, initiating a second affected user action, wherein the second affected user action includes at least one of: adjusting the vibration-inducing operations to avoid exceeding the second acceptable threshold at the second area of concern or informing a second affected user associated with the second area of concern.

18. The system of claim 17, wherein the analyzing includes combining the vibration effect data and the acoustic effect data to identify a source of excessive effects of at least one of: the vibration effects or the acoustic effects.

19. The system of claim 16, wherein the first area of concern is one of: a research institution or a manufacturing facility.

20. The system of claim 16, wherein the vibration-inducing operations include operating a train.

* * * * *